(12) United States Patent
Snabl

(10) Patent No.: US 9,477,374 B1
(45) Date of Patent: Oct. 25, 2016

(54) SYSTEM AND METHOD FOR FACILITATING INTEGRATED SOCIAL GROUP INSTANT MESSAGING

(75) Inventor: Jakub Snabl, McMahons Point (AU)

(73) Assignee: Google Inc., Mountain View, CA (US)

( * ) Notice: Subject to any disclaimer, the term of this patent is extended or adjusted under 35 U.S.C. 154(b) by 197 days.

(21) Appl. No.: 13/448,295

(22) Filed: Apr. 16, 2012

Related U.S. Application Data

(60) Provisional application No. 61/582,085, filed on Dec. 30, 2011.

(51) Int. Cl.
| | |
|---|---|
| G06F 15/16 | (2006.01) |
| G06F 3/0481 | (2013.01) |
| G06F 3/0484 | (2013.01) |
| H04L 29/08 | (2006.01) |
| H04L 12/58 | (2006.01) |

(52) U.S. Cl.
CPC ....... G06F 3/04817 (2013.01); G06F 3/04842 (2013.01); H04L 51/36 (2013.01); H04L 67/24 (2013.01)

(58) Field of Classification Search
CPC .............. G06F 15/16; G06F 3/04817; G06F 3/04842; G06Q 10/107; G06Q 50/01; H04L 12/581; H04L 51/04; H04L 51/32; H04L 51/36; H04L 67/24; H04L 67/306; H04L 12/588; H04L 12/589; H04L 51/00; H04L 51/043; H04L 12/5815
USPC ........................................................ 709/206
See application file for complete search history.

(56) References Cited

U.S. PATENT DOCUMENTS

| | | | |
|---|---|---|---|
| 6,677,968 B1* | 1/2004 | Appelman | 715/853 |
| 7,882,194 B2 | 2/2011 | Lingafelt et al. | |
| 2001/0013050 A1* | 8/2001 | Shah | 709/202 |
| 2004/0015547 A1 | 1/2004 | Griffin et al. | |
| 2004/0078441 A1* | 4/2004 | Malik et al. | 709/206 |
| 2006/0167991 A1* | 7/2006 | Heikes et al. | 709/204 |

(Continued)

OTHER PUBLICATIONS

Collier, Marsha. Facebook & Twitter for Seniors for Dummies. Hoboken, NJ: Wiley Publishing, 2010. Print.*

(Continued)

*Primary Examiner* — Brian J Gillis
*Assistant Examiner* — Austin Moreau
(74) *Attorney, Agent, or Firm* — McDermott Will & Emery LLP

(57) ABSTRACT

A system and machine-implemented method for providing integrated instant messaging functionality in a social networking service, the method including receiving a request from a user having a first user account at a social networking service to view contacts belonging to a social group associated with the first user account, wherein the social group is maintained at the social networking service, identifying one or more contacts belonging to the social group in response to the request, determining a status associated with a user account for each of the identified one or more contacts, the status indicating whether each of the one or more contacts is available for instant messaging communication and providing a listing including the identified one or more contacts and the status associated with each of the identified one or more contacts for display to the user at a social networking site of the social networking service.

15 Claims, 5 Drawing Sheets

(56) References Cited

U.S. PATENT DOCUMENTS

| | | | |
|---|---|---|---|
| 2007/0286366 A1* | 12/2007 | Deboy | G06Q 10/107 379/93.17 |
| 2009/0160876 A1* | 6/2009 | King et al. | 345/676 |
| 2009/0313336 A1* | 12/2009 | Haynes et al. | 709/206 |
| 2010/0058196 A1* | 3/2010 | Krishnan | G06Q 10/10 715/747 |
| 2010/0077303 A1* | 3/2010 | Jones | G06F 17/30884 715/700 |
| 2010/0199340 A1* | 8/2010 | Jonas et al. | 726/8 |
| 2011/0173257 A1* | 7/2011 | Tu | 709/203 |
| 2012/0054288 A1* | 3/2012 | Wiese et al. | 709/206 |
| 2012/0302256 A1* | 11/2012 | Pai | H04W 4/02 455/456.2 |

OTHER PUBLICATIONS

Rapportive. Internet Archive. [ > database online], [retrieved on Dec. 16, 2013]. Retrieved from the Internet < URL: *> https://web.archive.org/web/20100908040155/http://rapportive.com/ <.*

"About the people widget—Gmail Help," updated Apr. 6, 2012, printed Apr. 13, 2012, 3 pgs., <http://support.google.com/mail/bin/answer.py?hl=en&answer=1251806>.

* cited by examiner

SYSTEM AND METHOD FOR FACILITATING INTEGRATED SOCIAL GROUP INSTANT MESSAGING

The present application claims the benefit of U.S. Provisional Patent Application Ser. No. 61/582,085, entitled "System and Method For Facilitating Integrated Social Group Instant Messaging," filed on Dec. 30, 2011, which is hereby incorporated by reference in its entirety for all purposes.

BACKGROUND

The subject disclosure generally relates to instant messaging services, and, in particular, to providing integrated instant messaging functionality with respect to social groups at a social networking site.

Users of social networking sites may create associations with one another. Such user associations may be defined on a user-to-user basis, or as a group of users associated through membership within a group. A user may create social groups including one or more contacts to organize his/her associations. The social groups may be additionally used to control distribution of messages and content to contacts of the user. Various social networking sites further provide instant messaging functionality allowing a user to communicate with his/her contacts. The instant messaging functionality allows a user to communicate with contacts by selecting contacts from a contact list. The user may further communicate with more than one user using a group instant messaging function by adding users to an instant messaging session. However, the instant messaging functionally is independent from the other actions performed with respect to a social group and the contact list does not provide any indication of the contact groups associated with each contact.

Thus, it may be desirable to provide the user with a more effective way of communicating with contacts organized into social groups using an instant messaging service.

SUMMARY

The disclosed subject matter relates to a method executed on one or more computing devices for providing integrated instant messaging functionality in a social networking service, the method comprising receiving a request from a user having a first user account at a social networking service to view contacts belonging to a social group associated with the first user account, wherein the social group is maintained at the social networking service. The method further comprising identifying, using the one or more computing devices, one or more contacts belonging to the social group in response to the request. The method further comprising determining, using the one or more computing devices, a status associated with a user account for each of the identified one or more contacts, the status indicating whether each of the one or more contacts is available for instant messaging communication and providing a listing including the identified one or more contacts and the status associated with each of the identified one or more contacts for display to the user at a social networking site of the social networking service.

The disclosed subject matter also relates to a system for providing integrated instant messaging functionality in a social networking service, the system comprising one or more processors and a machine-readable medium comprising instructions stored therein, which when executed by the processors, cause the processors to perform operations comprising providing a listing of one or more social groups associated with a first user account associated with a user maintained at a social networking service for display to the user at a social networking site associated with the social networking service. The operations further comprising receiving a request from the user to view contacts belonging to a social group from the listing. The operations further comprising identifying one or more contacts belonging to the social group in response to the request. The operations further comprising determining an instant messaging status associated with a user account for each of the identified one or more contacts and providing a listing including the identified one or more contacts and the instant messaging status associated with the user account of each of the identified one or more contacts for display to the user at a social networking site of the social networking service.

The disclosed subject matter also relates to a machine-readable medium comprising instructions stored therein, which when executed by a machine, cause the machine to perform operations comprising receiving a request from a user to view a listing of one or more social groups associated with the user account of the user at a social networking service. The operations further comprising providing a listing including the one or more social groups for display to the user at a social networking site associated with the social networking service. The operations further comprising receiving an indication of a selection of a social group from the listing by the user. The operations further comprising identifying one or more contacts belonging to the social group in response to receiving the indication. The operations further comprising determining an instant messaging status associated with a user account for each of the identified one or more contacts and providing a listing including the identified one or more contacts and the instant messaging status associated with each of the identified one or more contacts for display to the user on a graphical user interface displayed at a social networking site of the social networking service.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
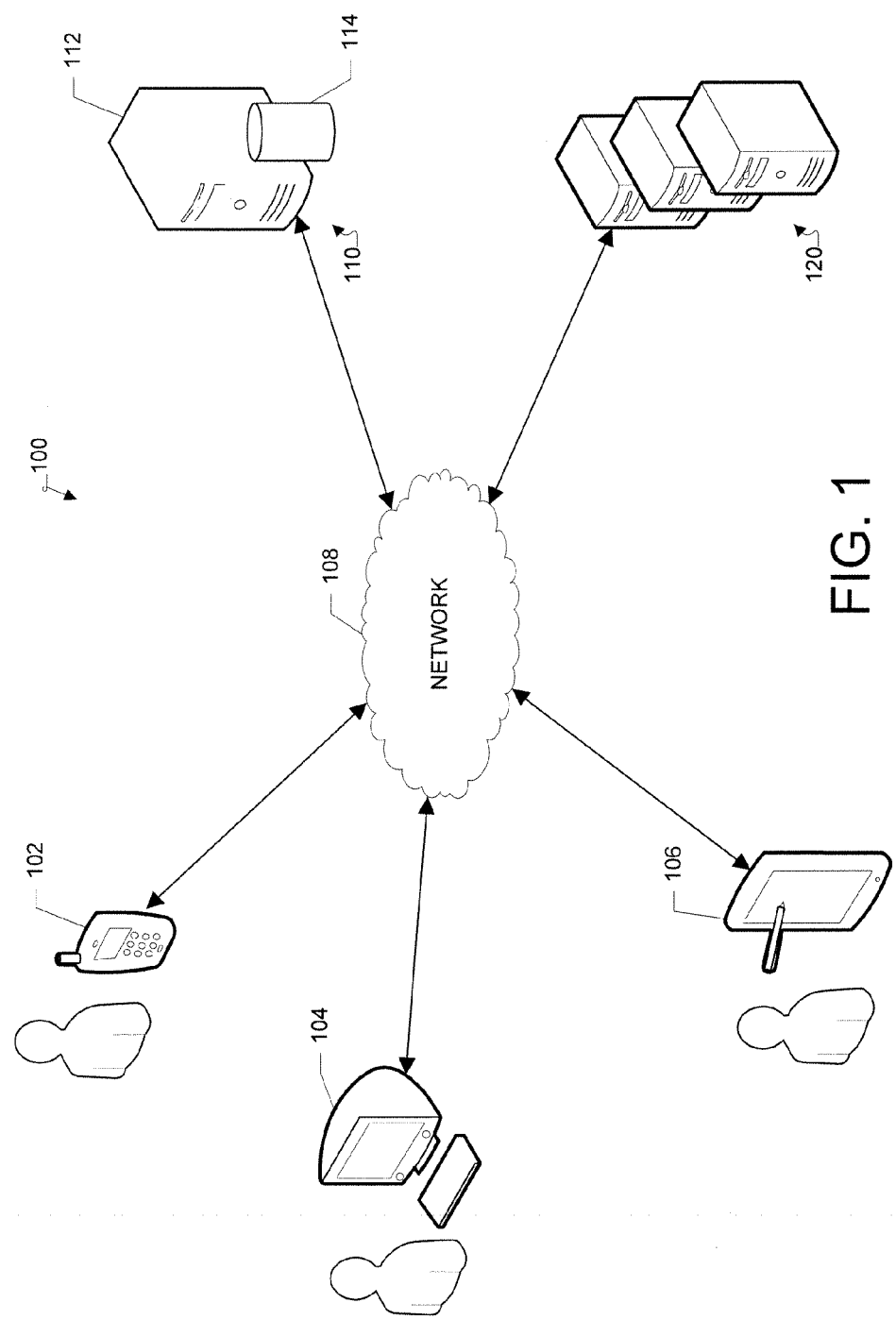
FIG. 1 illustrates an example client-server network environment which provides for facilitating instant messaging with contacts organized into social groups.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

I. Overview

The subject disclosure provides a method and system for facilitating integrated instant messaging functionality for a user of a social networking service to communicate with his/her contacts organized into social groups. For example, a user of an electronic device may have different groups of friends, coworkers, and family. Through the creation and use of social groups (e.g., social circles), the user can organize and categorize his/her contacts into various different groupings. The subject disclosure allows the user to view the availability of contacts within each social group for instant messaging and further provides for starting an individual instant messaging session with a contact within a social group or a group instant messaging session with the contacts within a social group.

Users of social networking services may create associations with one another. The phrase "social networking service" as used herein encompasses its plain and ordinary meaning, including, but not limited to, an online service, platform or site that focuses on building and reflecting of social associations among users. These associations may be stored within a social graph at each social networking service. Such user associations may be defined on a user-to-user basis, or as a group of users associated through membership within a group. As used herein, "contacts" refer to other users that a user is associated with, at one or more social networking services.

A user may create "social groups" (e.g., social circles) including one or more contacts to organize his/her associations. For example, the user may select one or more contacts and add those contacts to a pre-existing or new social group. The social groups may be additionally used to control distribution of messages and content to contacts of the user. For example, "social circles" are categories to which a user can assign their social networking contacts and better control the distribution and visibility of social networking messages as well as other multimedia content (e.g., documents, and other collaboration objects). In accordance with the subject disclosure, a social group or social circle may be a data set defining a collection of contacts that are associated with one another. As used herein, a social group or social circle can be described from the perspective of an individual that is the center of a particular collection of socially interconnected people, or from the aggregate perspective of a collection of socially interconnected people. In some examples, a social circle can have narrowly defined boundaries, all of the members of the social circle may be familiar with one another and permission may be required for a member to join a social circle. A user of an electronic device may define a social circle, and the social circle, as a data set defining a collection of contacts, may reflect a real-life social circle of the user.

In some embodiments, a social group may be asynchronous. For example, a first user may form a social group including one or more other users (e.g., a group of friends or family members). The users associated with the social group may or may not have a corresponding social group including the user and/or the other one or more users. To give a more specific example, a first user may have a group "siblings" that includes her two brothers and one sister. The sister may have a social group for "nuclear family" that includes the first user, her two brothers, and her parents. The two brothers may have created no social groups at all. In this way, although the accounts of the user may be connected in various ways, each user may be able to define one or more social groups including one or more of his/her contacts separately and distinctly.

For example, a user of an electronic device may have different groups of friends, coworkers, and family, and there may be some overlap among those groups (e.g., a coworker who is also considered to be a friend, a family member who is also a coworker). Through the creation and use of social groups (e.g., social circles), the user can organize and categorize his/her contacts into various different groupings.

The social networking service maintains a social graph of users and their interconnections. The social networking service may further maintain a listing of social groups associated with each user account. A user may request to view a listing of his/her social groups (e.g., by clicking on the user group icon or other identifier). The social groups may be displayed to the user using various layouts. The user may then select a group from the displayed groups to view contacts within the group. Upon receiving the request to display the contacts within the group, the contacts within the social group are determined by the social networking site and displayed to the user.

The present disclosure further facilitates integrating instant messaging capability into the graphical user display displaying the social group(s) associated with a user such that when the user requests to view the group, the user is provided with an indication of the availability of the contacts within the social group for communication through an instant messaging service. Various instant messaging services provide means for users to set a status while online, indicating the availability of the user to engage in a conversation. The status may be set as available, busy, idle, or a customized status created by the user (e.g., working, in a meeting). Additionally, a user may choose to be invisible, where even though the user is online, the user will appear as offline to contacts on his/her contact list.

According to the subject disclosure, the system may retrieve an instant messaging status for each contact within the group and may display the contact and an indication of his/her instant messaging status (e.g., an availability icon) in response to the request. The user may then select contacts while viewing the displayed information to start an instant messaging (e.g., chat or instant messaging) session. Additionally, the user may request to begin an instant messaging session with the social group. Upon receiving the request to start an instant messaging session with the group, the system identifies users available for instant messaging (based on the instant messaging status) and initiates an instant messaging session with contacts that are available for instant messaging. The instant messaging session may further be saved as an instant messaging thread for viewing by all users within the social group.

In this manner, a user is able to begin instant messaging with his contacts directly from the user interface displaying contacts within groups, instead of having to individually search for a contact through a separate instant messaging application or contact list. Furthermore, the user can keep his contacts organized for the purpose of communication within existing social groups, so that the user can determine user availability for instant messaging without having to search through all contacts within his/her contact list and/or having to create groups for organizing contacts within the contact list. Still further, the user is able to begin an instant messaging session with an existing social group. This may be helpful where the user would like to have instant messaging sessions to discuss ideas with a group of people repeatedly over a period of time (e.g., a team or family members).

Various embodiments of the subject disclosure may be described herein in reference to an instant messaging service for exemplary purposes. It should be understood by one of ordinary skill in the art that the system and processes described throughout the subject disclosure may be applicable to various instant messaging services.

The phrase "instant messaging service" as used herein is given its plain and ordinary meaning including, but not limited to, any service allowing for communication between two or more people (e.g., a user and his/her contacts) using personal computers or other electronic devices using messages. The phrase "instant messaging" as used herein may refer to a form of direct text-based communication in push mode between two or more people (e.g., a user and his/her contacts) using personal computers or other electronic devices, along with shared clients. The term further encompasses any kind of communication that offers a transmission of text-based (or other multi-media content) messages from a sender to a receiver and may include point-to-point communications as well as multicast communications from one sender to many receivers. The direct text-based communication and other transmission of text-based messages may be instantaneous, immediate, or may be queued for transmission based on system and network resources. More advanced instant messaging software clients may also allow enhanced modes of communication, such as live voice or video calling and inclusion of links to media. The user's messages may be conveyed over a network, such as the Internet.

The terms "status" and "instant messaging status" are used interchangeably throughout the subject disclosure, and are given their plain and ordinary meaning including, but not limited to, an indicator reflecting the user's availability to engage in communication with one or more other users through instant messaging. The status may for example be set to online indicating that the user is available for engaging in instant messaging communication and offline, which indicates that the user is not available to engage instant messaging communication. When the user is online, the status may further indicate a state of the user, for example the status may be set to available, indicating that the user is online and available to engage in a conversation, idle, indicating that the user is away from their client device, busy, indicating that the user is busy and would not want to be interrupted, invisible, which would cause the user to appear offline to his/her contacts when the user is actually available to engage in conversation, or the status may also be set to a personalized message or may include a personalized message.

II. Example Client-Server Network Environment for Facilitating Integrated Social Group Instant Messaging FIG. 1 illustrates an example client-server network environment which provides for facilitating instant messaging with contacts organized into social groups. A network environment 100 includes a number of electronic devices 102, 104, 106 communicably connected to a server 110 and remote servers 120 by a network 108. Network 108 can be a public communication network (e.g., the Internet, cellular data network, dialup modems over a telephone network) or a private communications network (e.g., private LAN, leased lines). Further, network 108 can include, but is not limited to, any one or more of the following network topologies, including a bus network, a star network, a ring network, a mesh network, a star-bus network, a tree or hierarchical network, and the like.

In some example embodiments, electronic devices 102, 104 and 106 can be computing devices such as laptop or desktop computers, smartphones, PDAs, portable media players, tablet computers, televisions or other displays with one or more processors coupled thereto or embedded therein, or other appropriate computing devices that can be used to for displaying a web page or web application. In the example of FIG. 1, electronic device 102 is depicted as a smartphone, electronic device 104 is depicted as a desktop computer and electronic device 106 is depicted as a PDA.

In one embodiment, server 110 includes a processing device 112 and a data store 114. Processing device 112 executes computer instructions stored in data store 114, for example, to facilitate integrated instant messaging functionality for social groups of users interacting with electronic devices 102, 104, 106. Server 110 may further be in communication with remote servers 120 either through the network 108 or through another network or communication means.

According to some aspects, remote servers 120 can be any system or device having a processor, a memory and communications capability for hosting various services including one or more remote social networking services and/or one or more instant messaging services. The local server 110 and/or remote servers 120 may maintain social graphs of users and their contacts. The remote social networking services hosted on the local server 110 and/or remote server 120 may enable users to create a profile and associate themselves with other users at a remote social networking service. The local server 110 and/or remote servers 120 may further facilitate the generation and maintenance of a social graph including the user created associations. The social graphs may include, for example, a list of all users of the remote social networking service and their associations with other users of a remote social networking service. In some example the server 110 and/or one or more remote servers 120 may further host one or more instant messaging services.

In some example aspects, server 110 and/or one or more remote servers 120 can be a single computing device such as a computer server. In other embodiments, server 110 and/or one or more remote servers 120 can represent more than one computing device working together to perform the actions of a server computer (e.g., cloud computing). In some embodiments, server 110 and/or one or more remote servers 120 may be coupled with various remote databases or storage services. While server 110 and the one or more remote servers 120 are displayed as being remote from one another, it should be understood by one skilled in the art that the functions performed by these servers may be performed within a single server, or across multiple servers.

Communications between the client devices 102, 104, 106, server 110 and/or one or more remote servers 120 may be facilitated through the HTTP communication protocol. Other communication protocols may also be facilitated including for example, XMPP communication, for some or all communications between the client devices 102, 104, 106, server 110 and one or more remote servers 120 (e.g., through network 108).

Users may interact with the system, one or more social networking services and/or one or more instant messaging services hosted by server 110, and/or one or more remote servers 120, through a client application installed at the electronic devices 102, 104, 106. Alternatively, the user may interact with the system, the one or more social networking services and/or the one or more instant messaging services through a web based browser application at the electronic devices 102, 104, 106. Communication between client devices 102, 104, 106 and the system, and/or one or more social networking services, may be facilitated through a network (e.g., network 108).

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

A user at a client device (e.g., electronic devices 102, 104 and 106) may log into his/her user account at a social networking service. The user account may be associated with one or more contacts. The contacts associated with the user may be organized into one or more social groups associated with the user account of the user. Upon logging in, the user may request to view a visual display of his/her social groups. The system upon receiving the request identifies the social groups associated with the user account of the user and generates a data set including the listing of the social groups and provides the data for display to the user (e.g., at a social networking site graphical user interface displayed at the user's client device).

The user may select a displayed social group to expand and view the contacts within the social group. Upon receiving an indication of a user request to view the contacts associated with the social group, the system identifies the contacts associated with the social group. The system further determines an instant messaging status associated with the contact account of the user. The status may for example be maintained at an instant messaging service (e.g., an instant messaging service communicably coupled to the system and/or social networking service). For each contact of the selected social group, the system identifies the user account associated with the contact and determines the status associated with a user account of the contact. A data set including the contacts and the status associated with each contact is generated and provided for display at the client device of the user (e.g., electronic device 102, 104 and 106).

The contacts associated with the social group and the status for each contact is displayed to the user directly at the social networking site upon selecting the social group and the user may select to begin an instant messaging session with one or more contacts within the social group directly from the social networking site graphical user interface displaying the social group and/or the one or more contacts associated with social group. Furthermore, the user may request to begin an instant messaging session with the social group. The system, upon receiving an indication of a user request to begin an instant messaging session, determines if the instant messaging session is between the user and one or more specific contacts or whether the request is directed to the social group. The system then initiates an instant messaging session including the contacts available for communication based on the determined instant messaging status of the contacts.

Figure 2:
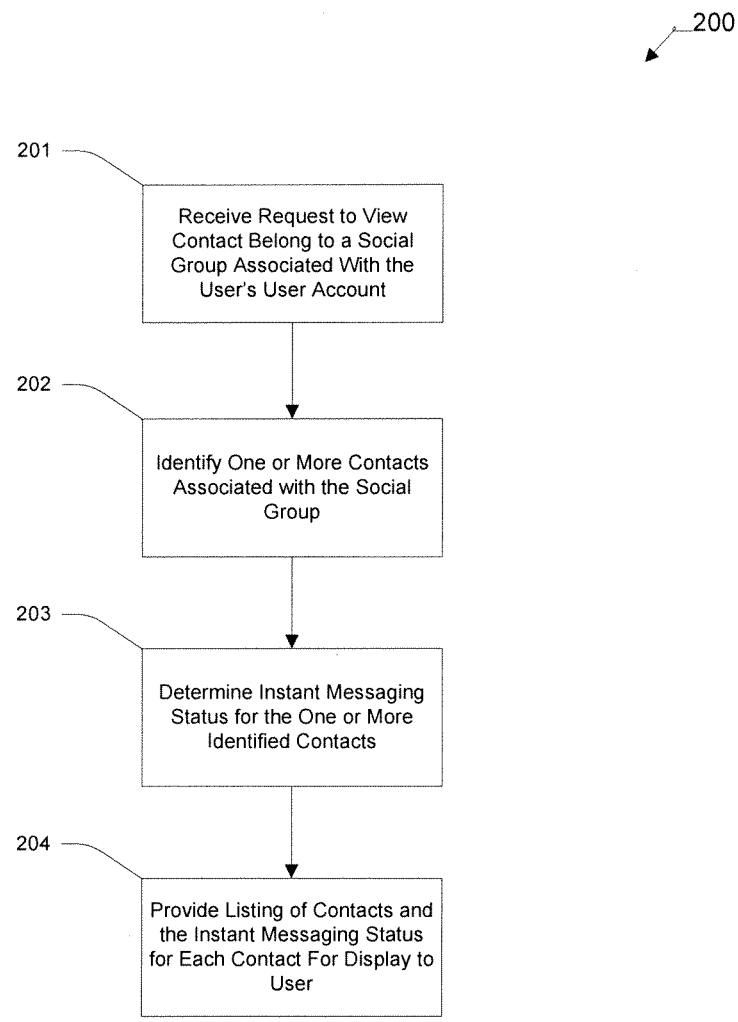
FIG. 2 illustrates a flow chart of an example process for providing a user of a social networking service with instant messaging information associated with a social group.

III. Example Processes for Facilitating Integrated Social Group Instant Messaging FIG. 2 illustrates a flow chart of an example process for providing a user of a social networking service with instant messaging information associated with a social group. In block 201, the system receives an indication of a request from a user to view contacts belonging to a social group. For example, a user logged into a social networking service, and viewing a listing of one or more social groups associated with his/her user account at the social networking service may select to view the contacts associated with one of the one or more social groups (e.g., by selecting a link or social group icon or a button displayed at the social networking site associated with the social networking service).

In block 202, the system identifies one or more contacts associated with the selected social group. In one example, the social networking service may maintain a social graph storing associations between the user and one or more contacts and may further maintain information regarding the grouping of the contacts within one or more social groups associated with the user. In one example, upon receiving the indication of the user request, the system determines the contacts associated with the selected social group (e.g., by requesting the information from the social networking service). In block 203, the system determines an instant messaging status for each of the one or more identified contacts. For example, at least some of the identified contacts belong to the social group may have an instant messaging account (e.g., as part of the user account at the social networking service, or maintained at an instant messaging service). The system determines the status associated with the contact account of each of the one or more contacts (e.g., when those contacts have an instant messaging feature enabled and/or have an instant messaging account). In one example, the instant messaging status may be determined for those contacts which have installed or authorized an instant messaging feature and/or those contacts providing proper permissions to the system, the social networking service and/or an instant messaging service.

In block 204, the system provides the listing of the identified contacts and the determined instant messaging status for each of the one or more contacts or for those contacts where such information is available for display to the user at the social networking site associated with the social networking service. Accordingly, the user does not have to refer to a separate contact list to determine the availability of contacts for instant messaging communications. Additionally, because the availability of contacts is viewable in the context of the social group, the user can more easily assess the availability of contacts belonging to a specific social group and can initiate communication with contacts under the social group without having to traverse his/her entire contacts list. The organization and management of contacts is similarly made easier because the instant messaging features are integrated into the existing social groups such that the user does not have to duplicate the efforts and organize his contacts within his/her contact list into groups.

The user, upon viewing the displayed information at the social networking service, can request to initiate communication with one or more social networking contacts. The graphical user interface displaying the one or more contacts may provide one or more mechanisms for selecting one or more contacts for initiating an instant messaging session and/or a mechanism for initiating a social group instant messaging session. For example, a button or a drop down menu may be provided next to each contact, or a selection box may be provided for selecting one or more contacts. Furthermore, a button or drop down menu may be displayed next to the social group to allow initiating an instant messaging session with contact(s) of the social group. An example graphical user interface displaying social groups and one or more contacts is described in further detail below with respect to FIG. 4.

Figure 3:
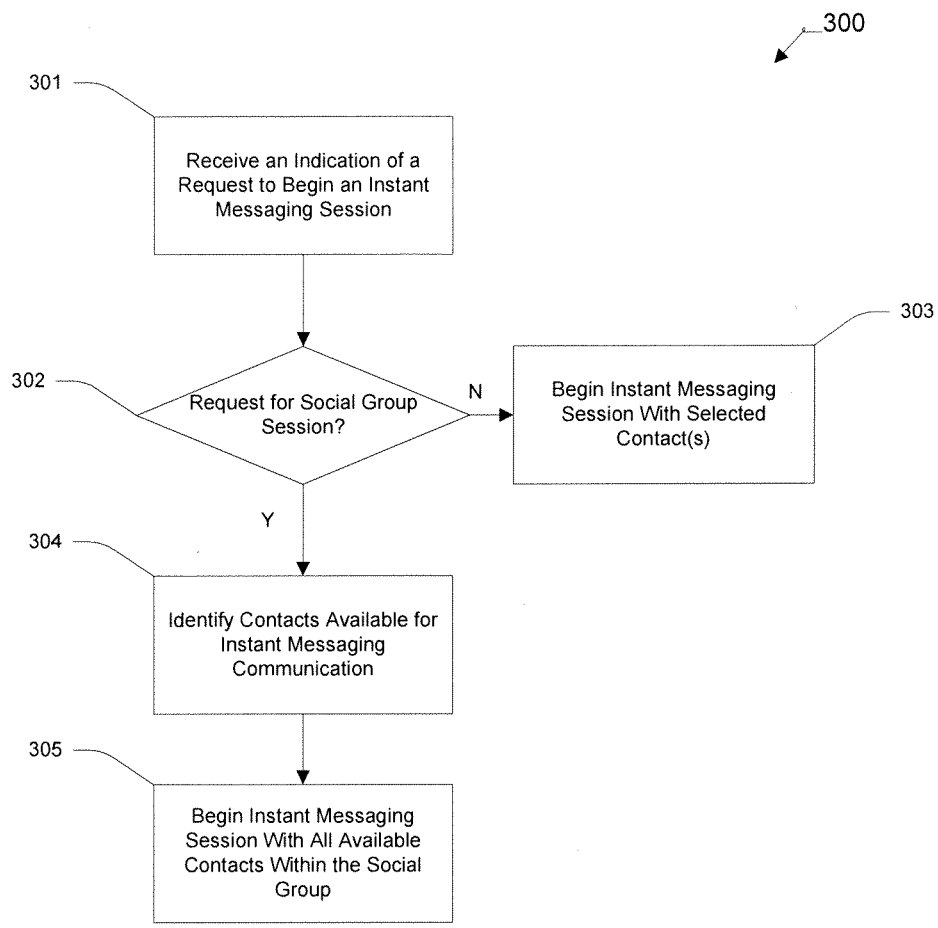
FIG. 3 illustrates an example process for facilitating an instant messaging session with contacts associated with a social group maintained at a social networking service.

FIG. 3 illustrates an example process for facilitating an instant messaging session with contacts associated with a social group maintained at a social networking service. In block 301, the system receives an indication of a request from a user to begin an instant messaging session. In one example, as described above, a mechanism for initiating an instant messaging session with one or more contacts associated with a social group and/or the social group generally. In one example, the user may request to initiate an instant messaging session using one of the one or more provided mechanisms displayed along with the displayed listing of social groups and/or listing of contacts of social groups being displayed to the user at the social networking site associated with the social networking service.

In block 302, the system determines if the request is for a social group instant messaging session. As described above, upon viewing the one or more contacts associated with a social group, the user may select specific contact(s) for initiating an instant messaging session, of may request to initiate an instant messaging session with the social group generally. If, in block 302, the system determines that the request is not a social group instant messaging session request (i.e., the user has selected specific contacts instead of the social group), the process continues to block 303.

In block 303, the system initiates the instant messaging session with the selected one or more contacts. In one example, the initiation of an instant messaging session is performed by sending a request to the instant messaging service (e.g., hosted at remote server 120) including a listing of the one or more contacts selected by the user. The generated instant messaging session is provided for display to the user at the social networking site associated with the social networking service. In one example, the selected contacts are selected by the user based on their status, and those users not available for instant messaging according to their determined status may not be selectable by the user (e.g., grayed out), or may not be added to the instant messaging session if they are selected by the user.

Otherwise, if in block 303 it is determined that the request is for initiating an instant messaging session with the social group, in block 304, the system identifies the contacts of the social group available for communication based on the determined instant messaging status of the contacts of the social group. In block 305, the system initiates an instant messaging session with the identified contacts of the social group available to join the instant messaging session. In one example, to initiate the instant messaging session, the system provides a list of the contacts of the social group determined to be available and requests that the instant messaging service create an instant messaging session with the provided contacts. The generated instant messaging session is provided for display to the user at the social networking site associated with the social networking service.

While the processes described herein are described as being performed by the system, it should be understood that various blocks may be performed by one or more local and/or remote services (e.g., the social networking service, the instant messaging service). For example, one of more of the blocks of the process could be performed by a user's electronic device.

Figure 4:
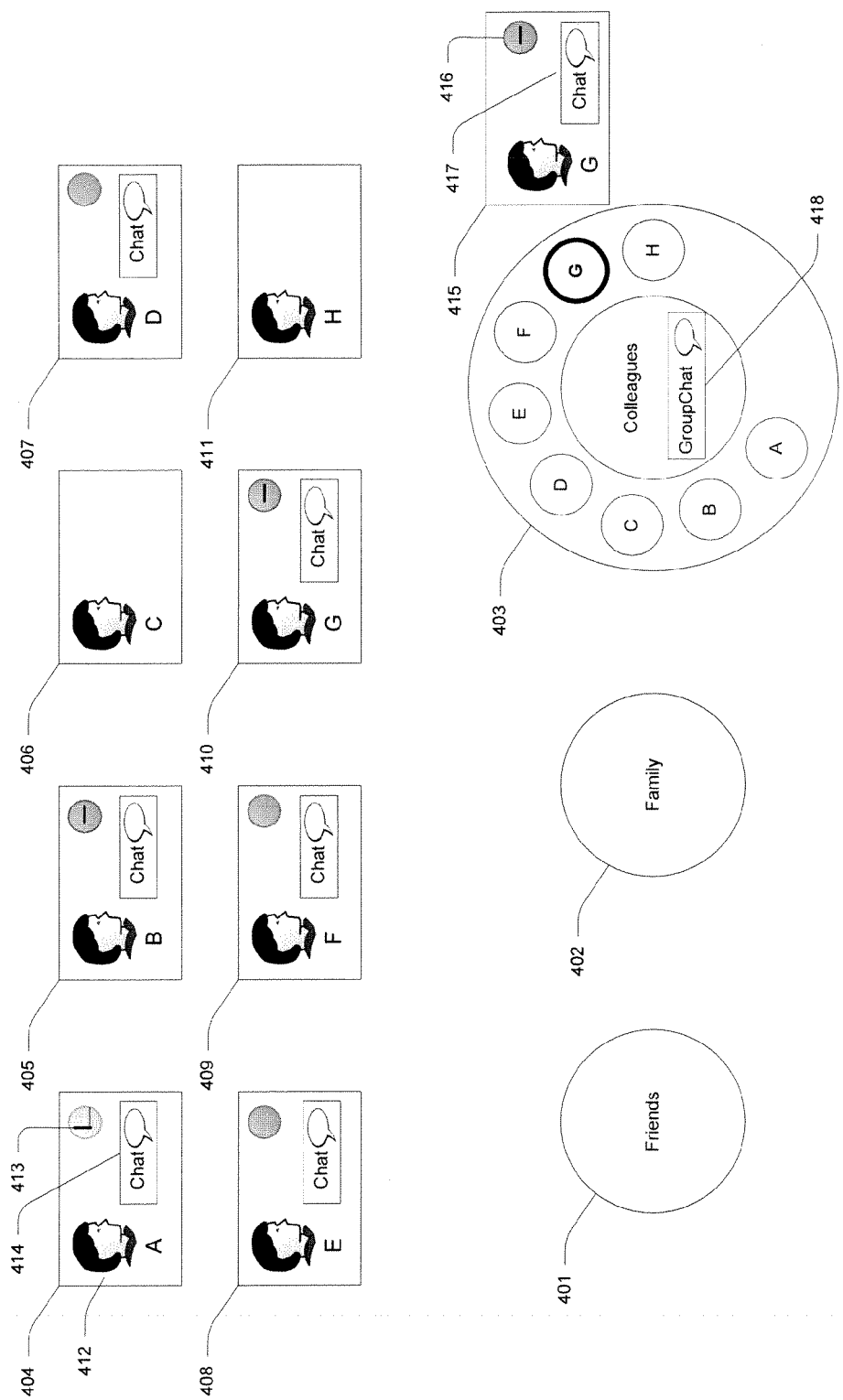
FIG. 4 illustrates an example screen shot of a graphical user interface displaying user social groups with integrated instant messaging functionality.

FIG. 4 illustrates an example screen shot of a graphical user interface displaying user social groups with integrated instant messaging functionality. As illustrated, the user has three social groups 401, 402 and 403. Social group 401 is named "friends" and may include one or more contacts of the user. Social group 402 is named "family" and may include one or more contacts of the user. Social group 403 is named "Colleagues" and as illustrated includes contacts A-H. The user may select one of the one or more social groups, and the social group may be expanded to display the contacts within the social group. Furthermore, as illustrated, when the social group 403 is expanded, the contacts may be displayed as tiles 404-411. Each user is displayed with an image, and the name of the contact. Each tile 404-411 further illustrates an indication of the contact's instant messaging status as an availability icon and a mechanism, illustrated as a "chat" button, for allowing the user to initiate an instant messaging conversation with the contact. For example, tile 404 is illustrated as displaying an image 412 of user A, and includes an availability icon 413 and chat button 414. Availability icons and chat button may be displayed for those users available for instant messaging (e.g., online and/or having instant messaging functionality enabled on their user accounts). For example, as illustrated in FIG. 4, users A, B, E, F and G are displayed having an availability icon and chat button displayed within their tile while users C and H do not have an availability icon or chat button displayed. In another example, a specific icon may be displayed indicating that the user is not available or does not have instant messaging functionality capabilities, and/or the chat button may be displayed but not selectable (e.g., grayed out).

In addition, the user may select the user from the contacts from the expanded social circle and a tile associated with the user may be displayed. For example, in FIG. 4, contact G has been selected by the user and a tile 415 is displayed including an indication of the contact's instant messaging status as an availability icon 416 and chat button 417, such that the user may initiate an instant messaging communication with contact G. Furthermore, a "Group Chat" button 418 is displayed, which may be selected to begin an instant messaging communication with one or more users available for instant messaging. The user, upon viewing the displayed information at the social networking service, can request to initiate communication with one or more social networking contacts.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

IV. Example System for Facilitating Integrated Social Group Instant Messaging

Figure 5:
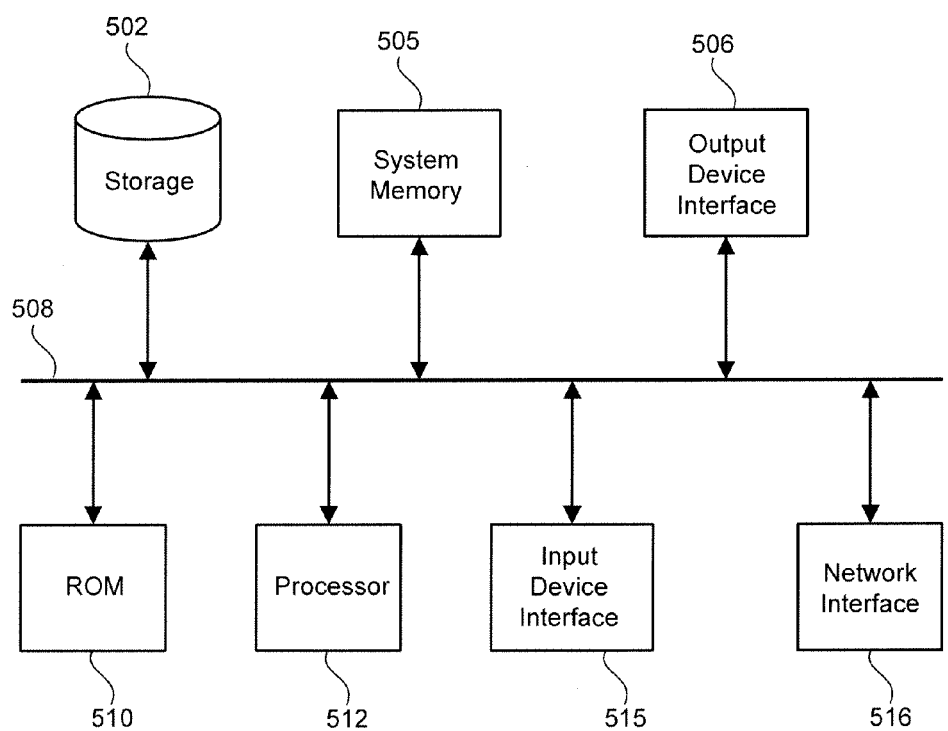
FIG. 5 conceptually illustrates an electronic system with which some implementations of the subject technology are implemented.

FIG. 5 conceptually illustrates an electronic system with which some implementations of the subject technology are implemented. Electronic system 500 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for facilitating a social group instant messaging session according to various embodiments. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of blocks in the processes disclosed is an illustration of exemplary approaches. Based upon design preferences, it is understood that the specific order or hierarchy of blocks in the processes may be rearranged, or that some illustrated blocks may not be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure. Features under one heading may be combined with features under one or more other heading and all features under one heading need not be use together. Features under one heading may be combined with features under one or more other heading and all features under one heading need not be use together.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method executed on one or more computing devices for providing integrated instant messaging functionality in a social networking service, the method comprising:
providing for display a plurality of selectable social group icons, each selectable social group icon representative of a respective social group of contacts selected from a collection of social contacts in an online social relationship with a first user account at a social networking service;
receiving a user selection of a first social group icon of the plurality of selectable social group icons;
expanding, in response to receiving the user selection, the first social group icon from a first size to a larger second size to reveal within the first social group icon a first social group of contacts associated with the first user account represented by the first social group icon, wherein each of the revealed contacts is graphically displayed within the first social group icon and has a user account at the social networking service and is associated with a social profile;
determining, using the one or more computing devices, for each of the revealed contacts, if the revealed contact is associated with an instant messaging account maintained by an instant messaging service or the social networking service, and displaying a status for the revealed contact indicating whether the revealed contact is available for instant messaging communication with a user of the first user account using the instant messaging account;
receiving a user selection of two or more revealed contacts that are available for instant messaging communication with the user, and a request to engage in instant messaging with the selected two or more revealed contacts; and
in response to receiving the user selection of the two or more revealed contacts and the request to engage, initiating an instant messaging communication session between the user and the selected two or more revealed contacts.

2. The method of claim 1, further comprising:
receiving a request from the user to create the first social group;
generating the first social group in response to receiving the request; and
adding each of the contacts belonging to the first social group to the first social group.

3. The method of claim 1, further comprising:
providing the plurality of selectable social group icons for display to the user at the social networking service.

4. The method of claim 3, further comprising:
receiving an indication of a request from the user to view social groups associated with the user;
identifying the one or more social groups and generating a graphical display including the identified one or more social groups.

5. The method of claim 1, wherein the determining comprises:
providing a request to the instant messaging service associated with the instant messaging account of each of the revealed contacts associated with an instant messaging account for the status of the revealed contact, the instant messaging service maintaining a status for the revealed contact; and
receiving the status for each of the revealed contacts associated with an instant messaging account in response to the request.

6. The method of claim 1, wherein the plurality of selectable social group icons are displayed at one or more client devices associated with the user account.

7. The method of claim 1, wherein revealing within the selectable social group icon the respective social group of contacts comprises revealing a group chat control within the selectable social group icon, the group chat control being for initiating instant message communication with revealed contacts that are available for instant messaging communication, and wherein the request to engage in instant messaging with the selected two or more revealed contacts comprises receiving an indication that the group chat control was activated.

8. A system for providing integrated instant messaging functionality in a social networking service, the system comprising:
one or more processors; and
a machine-readable medium comprising instructions stored therein; which when executed by the processors, cause the processors to perform operations comprising:
providing for display a plurality of selectable social group icons, each selectable social group icon representative of a respective social group of contacts selected from a collection of social contacts in an online social relationship with a first user account at a social networking service;
receiving a user selection of a first social group icon of the plurality of selectable social group icons;
expanding, in response to receiving the user selection, the first social group icon from a first size to a larger second size to reveal within the first social group icon a first social group of contacts represented by the first social group icon, wherein each of the revealed contacts is graphically displayed within the first social group icon;
determining, using the one or more computing devices, for each of the revealed contacts, if the revealed contact is associated with an instant messaging account maintained by an instant messaging service or the social networking service, and displaying a status for the revealed contact indicating whether the revealed contact is available for instant messaging communication with a user of the first user account using the instant messaging account;
receiving a user selection of two or more revealed contacts that are available for instant messaging communication with the user, and a request to engage in instant messaging with the selected two or more revealed contacts; and
in response to receiving the user selection of the two or more revealed contacts and the request to engage, initiating an instant messaging communication session between the user and the selected two or more revealed contacts.

9. The system of claim 8, the operations further comprising:
receiving a request from the user to create the first social group;
generating the first social group in response to receiving the request; and
adding each of the contacts belonging to the first social group to the first social group.

10. The system of claim 8, wherein the instant messaging session is displayed to the user at the social networking service.

11. The system of claim 8, wherein revealing within the selectable social group icon the respective social group of contacts comprises revealing a group chat control within the selectable group icon, the group chat control being for initiating instant message communication with revealed contacts that are available for instant messaging communication, and wherein the request to engage in instant messaging with the selected two or more revealed contacts comprises receiving an indication that the group chat control was activated.

12. A non-transitory machine-readable medium comprising instructions stored therein, which when executed by a machine, cause the machine to perform operations comprising:

providing for display a plurality of selectable social group icons, each selectable social group icon representative of a respective social group of contacts selected from a collection of social contacts in an online social relationship with a first user account at a social networking service;

receiving a user selection of a first social group icon of the plurality of selectable social group icons;

expanding, in response to receiving the user selection, the first social group icon from a first size to a larger second size to reveal within the first social group icon a first social group of contacts represented by the first social group image, wherein each of the revealed contacts is graphically displayed within the first social group icon;

determining, using the one or more computing devices, for each of the revealed contacts, if the revealed contact is associated with an instant messaging account maintained by an instant messaging service or the social networking service, and displaying a status for the revealed contact indicating whether the revealed contact is available for instant messaging communication with a user of the first user account using the instant messaging account;

receiving a user selection of two or more revealed contacts that are available for instant messaging communication with the user, and a request to engage in instant messaging with the selected two or more revealed contacts; and in response to receiving the user selection of the two or more revealed contacts and the request to engage, initiating an instant messaging communication session between the user and the selected two or more revealed contacts.

13. The machine-readable medium of claim 12, wherein the determining step comprises:

receiving a request from the user to create the first social group;

generating the first social group in response to receiving the request; and adding each of the contacts belonging to the first social group to the first social group.

14. The machine-readable medium of claim 12, wherein the determination step comprises:

providing a request to an instant messaging service associated with a user account of each of the one or more revealed contacts having an instant messaging account for the status of the revealed contact, the instant messaging service maintaining a status for the revealed contact; and receiving the instant messaging status for each of the one or more revealed contacts in response to the request.

15. The non-transitory machine-readable medium of claim 12, wherein revealing within the selectable social group icon the respective social group of contacts comprises revealing a group chat control within the selectable group icon, the group chat control being for initiating instant message communication with revealed contacts that are available for instant messaging communication, and wherein the request to engage in instant messaging with the selected two or more revealed contacts comprises receiving an indication that the group chat control was activated.

\* \* \* \* \*